United States Patent [19]
Timms

[11] Patent Number: 6,044,724
[45] Date of Patent: Apr. 4, 2000

[54] DRIVETRAIN LOCKING GEAR

[76] Inventor: Earl E. Timms, Rte. #2 Box #104, Leedey, Okla. 73654

[21] Appl. No.: 09/292,586

[22] Filed: Apr. 15, 1999

[51] Int. Cl.[7] .............................. F16H 57/10; B60K 41/26
[52] U.S. Cl. ....................... 74/411.5; 192/219; 192/219.4
[58] Field of Search .............................. 192/219.4, 220.2, 192/219, 219.5; 74/325, 339, 340, 342, 352, 411.5; 188/69, 60

[56] References Cited

U.S. PATENT DOCUMENTS

| | | | |
|---|---|---|---|
| 1,034,871 | 8/1912 | Campbell | 74/405 |
| 3,621,731 | 11/1971 | Houss | 74/411.5 |
| 5,179,868 | 1/1993 | Thibeault | 74/411.5 |
| 5,907,972 | 6/1999 | Del Sole | 74/411.5 |
| 5,964,335 | 10/1999 | Taniguchi et al. | 192/219.5 |

FOREIGN PATENT DOCUMENTS 218261   9/1987   Japan ...................................... 192/4 A

*Primary Examiner*—Charles A. Marmor
*Assistant Examiner*—Ha Ho

[57] ABSTRACT

A drivetrain locking gear for locking a drivetrain. The drivetrain locking gear includes a guide shaft extending from an inner wall of a transmission and a holed locking gear being slidably and nonrotatably disposed on the guide shaft. The locking gear selectively engages a fixed gear of a drive shaft for preventing rotation of the drive shaft. An actuation means permits selective engaging and disengaging of the locking gear from the fixed gear.

5 Claims, 3 Drawing Sheets

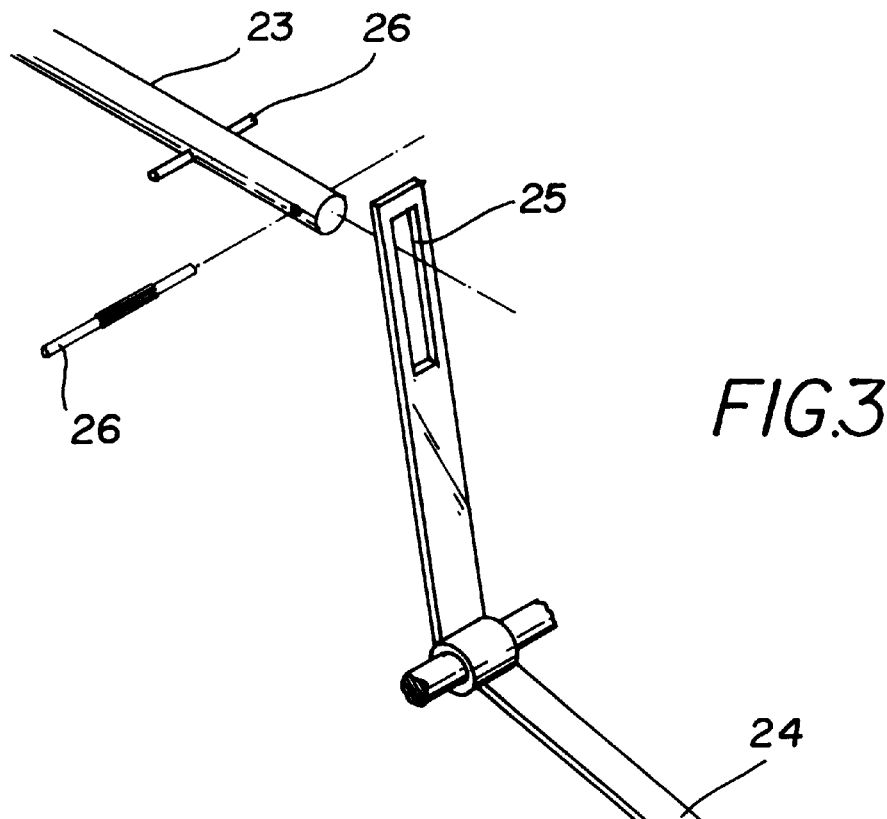
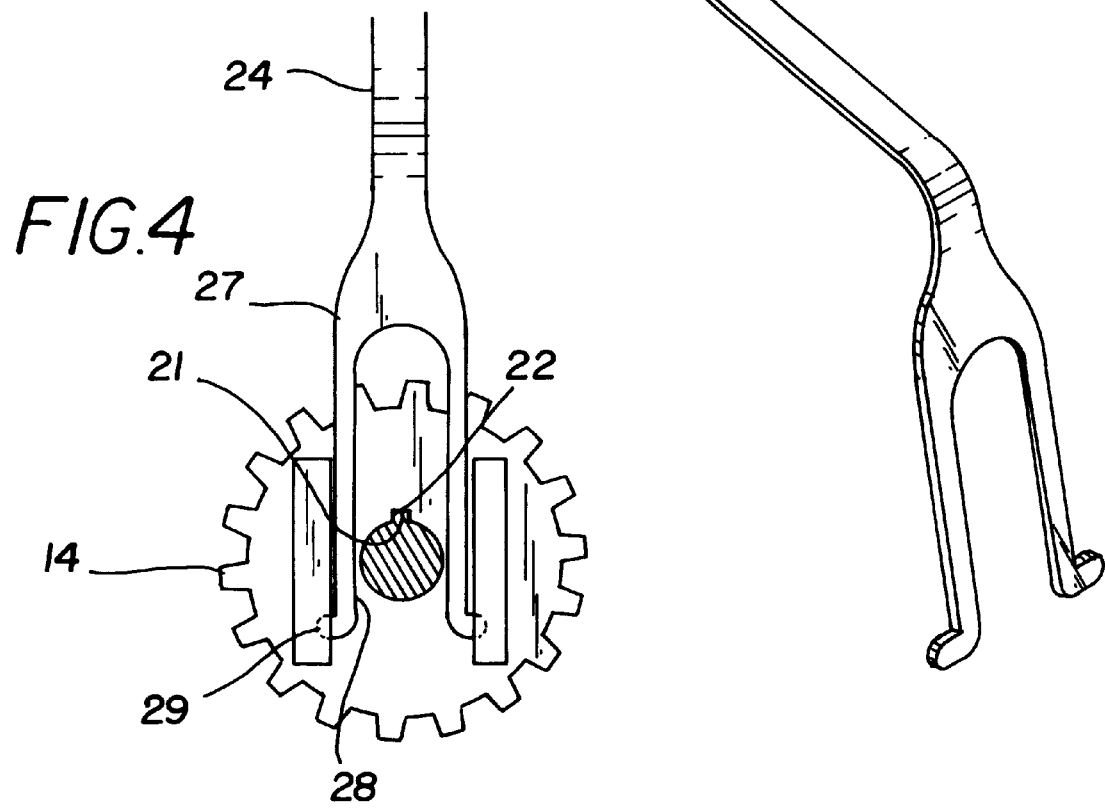

DRIVETRAIN LOCKING GEAR

BACKGROUND OF THE INVENTION

1. Field of the Invention

The present invention relates to parking gears and more particularly pertains to a new drivetrain locking gear for locking a drivetrain.

2. Description of the Prior Art

The use of parking gears is known in the prior art. More specifically, parking gears heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,844,223; U.S. Pat. No. 4,410,071; U.S. Pat. No. 4,031,977; U.S. Pat. No. 2,550,545; U.S. Pat. No. 1,851,571; and U.S. Pat. No. Des. 377,657.

While these devices fulfill their respective, particular objectives and requirements, the aforementioned patents do not disclose a new drivetrain locking gear. The inventive device includes a guide shaft extending from an inner wall of a transmission and a holed locking gear being slidably and nonrotatably disposed on the guide shaft. The locking gear selectively engages a fixed gear of a drive shaft for preventing rotation of the drive shaft. An actuation means permits selective engaging and disengaging of the locking gear from the fixed gear.

In these respects, the drivetrain locking gear according to the present invention substantially departs from the conventional concepts and designs of the prior art, and in so doing provides an apparatus primarily developed for the purpose of locking a drivetrain.

SUMMARY OF THE INVENTION

In view of the foregoing disadvantages inherent in the known types of parking gears now present in the prior art, the present invention provides a new drivetrain locking gear construction wherein the same can be utilized for locking a drivetrain.

The general purpose of the present invention, which will be described subsequently in greater detail, is to provide a new drivetrain locking gear apparatus and method which has many of the advantages of the parking gears mentioned heretofore and many novel features that result in a new drivetrain locking gear which is not anticipated, rendered obvious, suggested, or even implied by any of the prior art parking gears, either alone or in any combination thereof.

To attain this, the present invention generally comprises a guide shaft extending from an inner wall of a transmission and a holed locking gear being slidably and nonrotatably disposed on the guide shaft. The locking gear selectively engages a fixed gear of a drive shaft for preventing rotation of the drive shaft. An actuation means permits selective engaging and disengaging of the locking gear from the fixed gear.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drivetrain locking gear apparatus and method which has many of the advantages of the parking gears mentioned heretofore and many novel features that result in a new drivetrain locking gear which is not anticipated, rendered obvious, suggested, or even implied by any of the prior art parking gears, either alone or in any combination thereof.

It is another object of the present invention to provide a new drivetrain locking gear which may be easily and efficiently manufactured and marketed.

It is a further object of the present invention to provide a new drivetrain locking gear which is of a durable and reliable construction.

An even further object of the present invention is to provide a new drivetrain locking gear which is susceptible of a low cost of manufacture with regard to both materials and labor, and which accordingly is then susceptible of low prices of sale to the consuming public, thereby making such drivetrain locking gear economically available to the buying public.

Still yet another object of the present invention is to provide a new drivetrain locking gear which provides in the apparatuses and methods of the prior art some of the advantages thereof, while simultaneously overcoming some of the disadvantages normally associated therewith.

Still another object of the present invention is to provide a new drivetrain locking gear for locking a drivetrain.

Yet another object of the present invention is to provide a new drivetrain locking gear which includes a guide shaft extending from an inner wall of a transmission and a holed locking gear being slidably and nonrotatably disposed on the guide shaft. The locking gear selectively engages a fixed gear of a drive shaft for preventing rotation of the drive shaft. An actuation means permits selective engaging and disengaging of the locking gear from the fixed gear.

Still yet another object of the present invention is to provide a new drivetrain locking gear that will lock a manual transmission without having to turn the motor off.

Even still another object of the present invention is to provide a new drivetrain locking gear that prevents the death and injury commonly caused by failed parking brakes permitting a vehicle parked on a grade to roll out of control.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the actuator arm present invention.

FIG. 4 is a schematic detailed view of the present invention showing the coupling of the actuator arm to the locking gear.

DESCRIPTION OF THE PREFERRED EMBODIMENT

Figure 1:
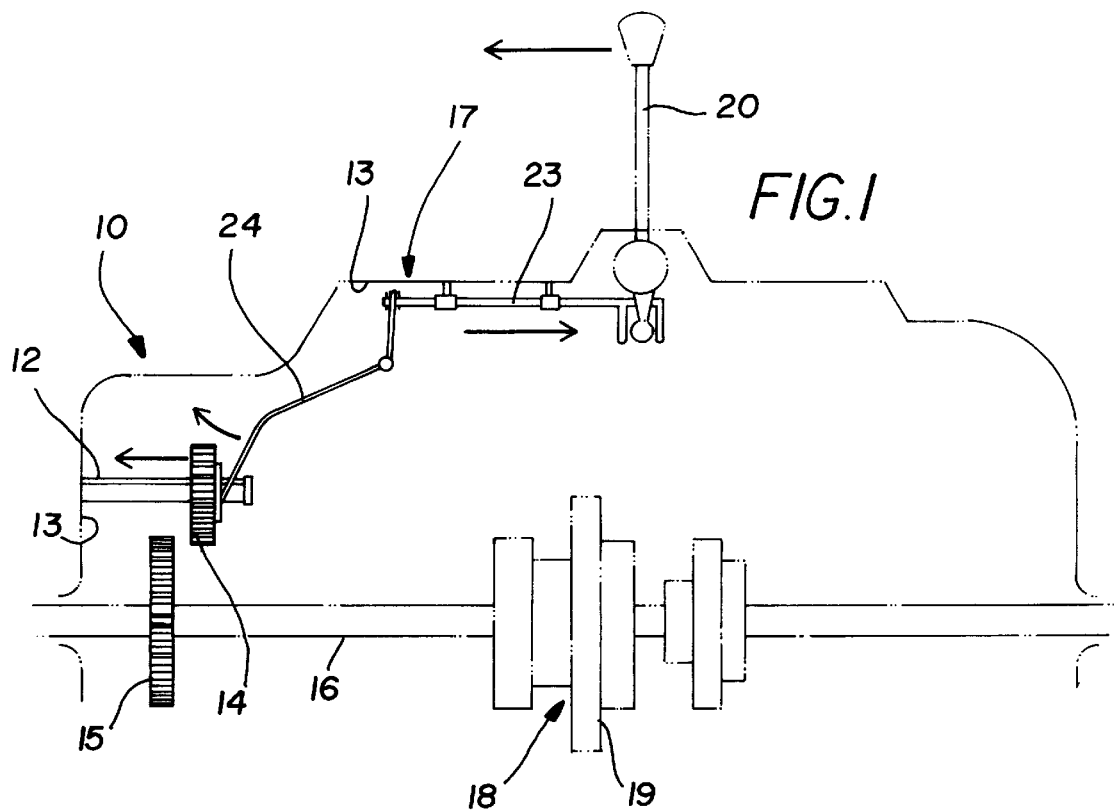
FIG. 1 is a schematic side view of a new drivetrain locking gear according to the present invention.
Figure 2:
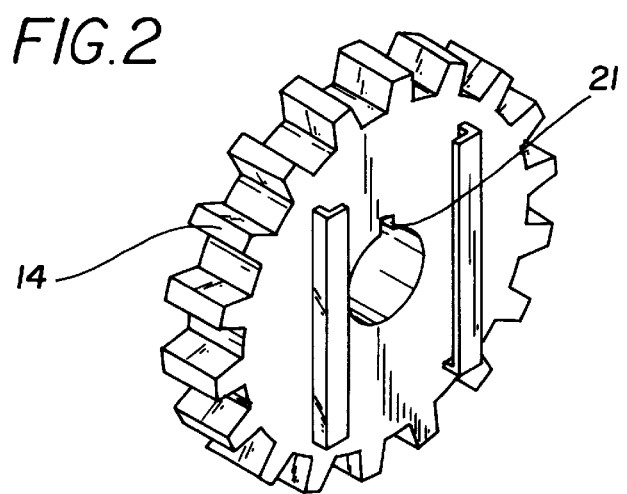
FIG. 2 is a schematic perspective view of the locking gear of the present invention.

With reference now to the drawings, and in particular to FIGS. 1 through 6 thereof, a new drivetrain locking gear embodying the principles and concepts of the present invention and generally designated by the reference numeral 10 will be described.

As best illustrated in FIGS. 1 through 6, the drivetrain locking gear 10 generally comprises a guide shaft 12 extending from an inner wall 13 of a transmission and a holed locking gear 14 being slidably and nonrotatably disposed on the guide shaft. The locking gear selectively engages a fixed gear 15 of a drive shaft 16 for preventing rotation of the drive shaft. An actuation means 17 permits selective engaging and disengaging of the locking gear from the fixed gear.

The invention is preferably adapted for mounting to a manual transmission 18 of a vehicle. The transmission has a drive shaft and a plurality of drive gears 19 operatively coupled to the drive shaft. The drive shaft is in direct communication with wheels (not shown) of the vehicle such that the drive shaft always turns when the wheels turn. A shifter 20 is operatively coupled to the drive gears. The drive shaft has a fixed gear fixedly and nonrotatably coupled to it.

The locking gear may have a groove 21 extending inwardly from a center hole of the locking gear. The guide shaft would have a rib 22 outwardly extending therefrom that would be slidably inserted in the groove of the locking gear to prevent rotation of the locking gear about the guide shaft.

Preferably, the actuation means comprising an extension rod 23 in communication with the shifter and an actuation arm 24 coupled to the extension rod and the locking gear. The extension rod is slidably coupled to an inner wall of the transmission. The actuation arm is pivotally coupled to an inner wall of the transmission.

Ideally, the extension rod slidably extends through an elongate slot 25 in the end of the actuation arm and is prevented from sliding out of the slot by a pair of pins 26. See FIG. 3. The pins are spaced apart to permit limited movement of that end of the actuation arm between the pins, necessary because the angle of that end of the actuation rod changes as the actuation arm pivots.

Preferably, the locking gear has a pair of angle brackets 27 coupled to an outer face thereof. The actuation arm has a generally U-shaped first end 27. The first end has a pair of fingers 28 each with end flange 29 outwardly extending therefrom and positioned between the outer face of the locking gear and the angle brackets such that the end flanges of the fingers are slidably coupled to the locking gear. See FIG. 4.

Figure 5:
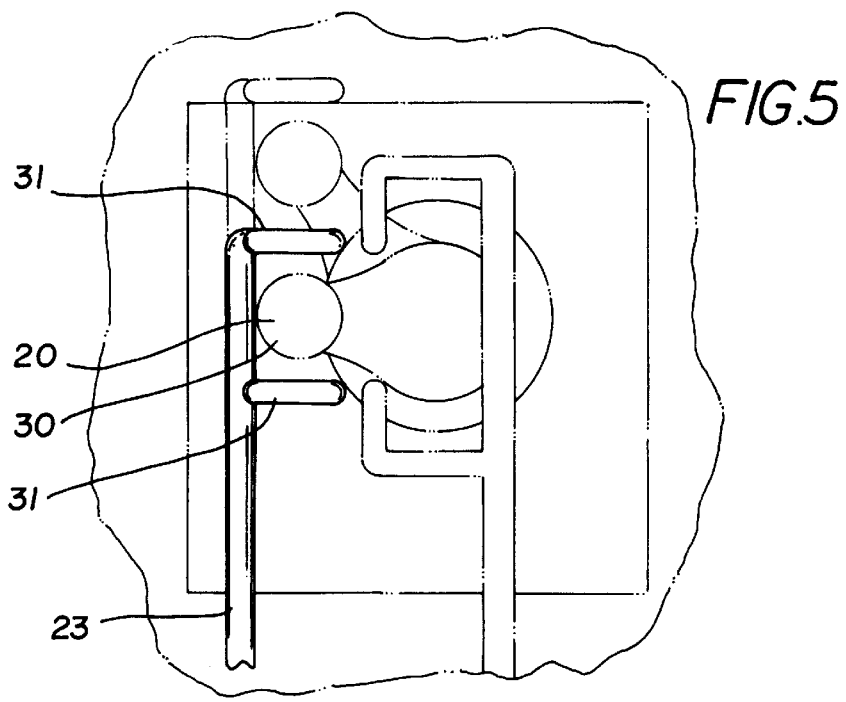
FIG. 5 is a schematic view of the present invention illustrating the coupling of the gear shift with an end of the actuation assembly.
Figure 6:
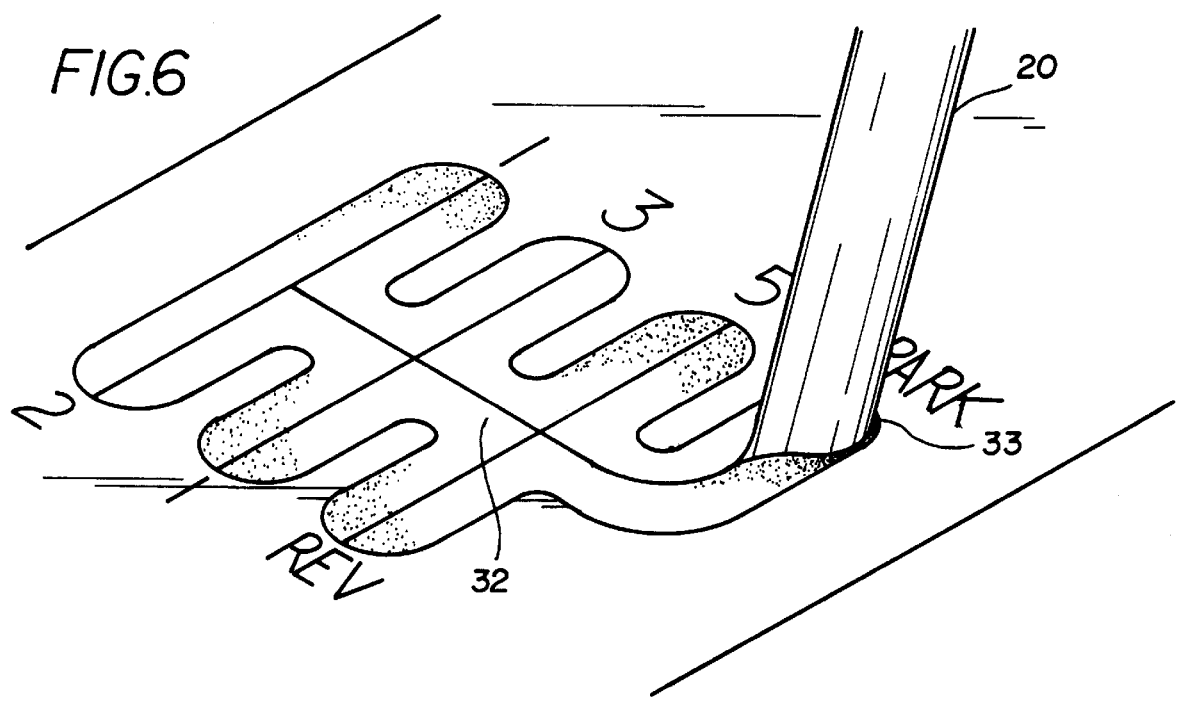
FIG. 6 is a schematic detailed perspective view of an alternative gear shift of the present invention.

Referring now to FIGS. 1, 5 and 6, it is seen that a lower engaging member 30 of the shifter moves into a channel formed by a pair of fingers 31 extending from the extension rod when the shifter is moved along a neutral line 32 towards the park position 33. When the shifter is pushed into the park position, the lower engaging member pushes on one of the fingers of the extension rod to move the extension rod towards the shifter.

In use, to engage the locking gear, shifter is moved towards a park position to move the extension rod away from the locking gear, thereby pivoting the actuation arm such that the first end of the actuation arm pushes the locking gear into mesh with the fixed gear of the drive shaft of the transmission, thereby locking with it to prevent it from rotating, and thus the drive wheels as well. The end flanges of the fingers slide up the front face of the locking gear as the actuation arm pivots. To disengage the locking gear, the shifter is moved out of the park position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking mechanism for a vehicle drivetrain having a drive shaft with a fixed gear nonrotatably coupled thereto, the locking mechanism comprising:

a guide shaft extending from an inner wall of a transmission;

a holed locking gear being slidably and nonrotatably disposed on said guide shaft, said locking gear selectively engaging a fixed gear of a drive shaft for preventing rotation of said drive shaft; and an actuation means for selectively engaging and disengaging said locking gear from said fixed gear.

2. The locking mechanism of claim 1, wherein said locking gear has a groove extending inwardly from a center hole of said locking gear, said guide shaft having a rib outwardly extending therefrom and being slidably inserted in said groove of said locking gear.

3. The locking mechanism of claim 1, wherein said actuation means comprises an extension rod in communication with a shifter of a vehicle and an actuation arm coupled to said extension rod and said locking gear, said extension rod being slidably coupled to an inner wall of said transmission, said actuation arm being pivotally coupled to an inner wall of said transmission.

4. The locking mechanism of claim 3, wherein said locking gear has a pair of angle brackets coupled to an outer face thereof, said actuation arm having a generally U-shaped first end, said first end having a pair of fingers each having an end flange outwardly extending therefrom and being positioned between said outer face of said locking gear and said angle brackets such that said end flanges of said fingers are slidably coupled to said locking gear.

5. A transmission with drivetrain locking mechanism, comprising:

a manual transmission of a vehicle having a drive shaft and a plurality of drive gears operatively coupled thereto;

a shifter operatively coupled to said drive gears;

said drive shaft having a fixed gear fixedly coupled thereto;

a guide shaft extending from an inner wall of said transmission;

a holed locking gear being slidably and nonrotatably disposed on said guide shaft, said locking gear selectively engaging said fixed gear of said drive shaft for preventing rotation of said drive shaft;

an actuation means for selectively engaging and disengaging said locking gear from said fixed gear;

said locking gear having a groove extending inwardly from a center hole of said locking gear, said guide shaft having a rib outwardly extending therefrom and being slidably inserted in said groove of said locking gear;

said actuation means comprising an extension rod in communication with said shifter and an actuation arm coupled to said extension rod and said locking gear, said extension rod being slidably coupled to an inner wall of said transmission, said actuation arm being pivotally coupled to an inner wall of said transmission; and said locking gear having a pair of angle brackets coupled to an outer face thereof, said actuation arm having a generally U-shaped first end, said first end having a pair of fingers each having an end flange outwardly extending therefrom and being positioned between said outer face of said locking gear and said angle brackets such that said end flanges of said fingers are slidably coupled to said locking gear.

* * * * *